United States Patent [19]

Abramopaulos

[11] 3,757,647

[45] Sept. 11, 1973

[54] COMBINED LAND AND AIR VEHICLE

[76] Inventor: John Abramopaulos, 24-29 42nd St., Long Island City, N.Y. 11103

[22] Filed: Apr. 14, 1971

[21] Appl. No.: 135,458

Related U.S. Application Data

[62] Division of Ser. No. 823,639, May 12, 1969, Pat. No. 3,612,441.

[52] U.S. Cl. .................................. 91/482, 91/487
[51] Int. Cl. ............................................ F01b 1/00
[58] Field of Search ..................... 91/188, 476, 478, 91/480, 482, 483, 481, 487; 417/269, 270; 74/60

[56] References Cited
UNITED STATES PATENTS

| | | | |
|---|---|---|---|
| 1,411,556 | 4/1922 | Almen | 74/60 |
| 2,706,384 | 4/1955 | Schott | 417/270 |
| 2,709,422 | 5/1955 | Bray | 91/478 |
| 2,997,956 | 8/1961 | Stewart | 417/269 |
| 1,964,340 | 6/1934 | Sorcy | 91/478 |
| 747,894 | 12/1903 | Schmucker | 91/478 |
| 1,813,526 | 7/1931 | Benedix | 91/478 |
| 3,196,698 | 7/1965 | Liddington | 74/60 |

FOREIGN PATENTS OR APPLICATIONS 283,279 9/1928 Great Britain ..................... 91/480

Primary Examiner—William L. Freeh
Assistant Examiner—Gregory LaPointe
Attorney—Jerome Bauer

[57] ABSTRACT

A land air vehicle comprising a chassis in which is journalled a pair of front steerable wheels and rear driven wheels, a superstructure mounted to said chassis journalling a helicopter rotor assembly, a compressor for creating a supply of pressurized air, a pneumatic motor coupled to the rear wheels, which motor is driven by the compressed air, and a jet propulsion system coupled to the rotor assembly also driven by said compressed air. The vehicle includes control means for selectively operating one or the other of the pneumatic motor or jet propulsion system in manual or automatic operation.

14 Claims, 12 Drawing Figures

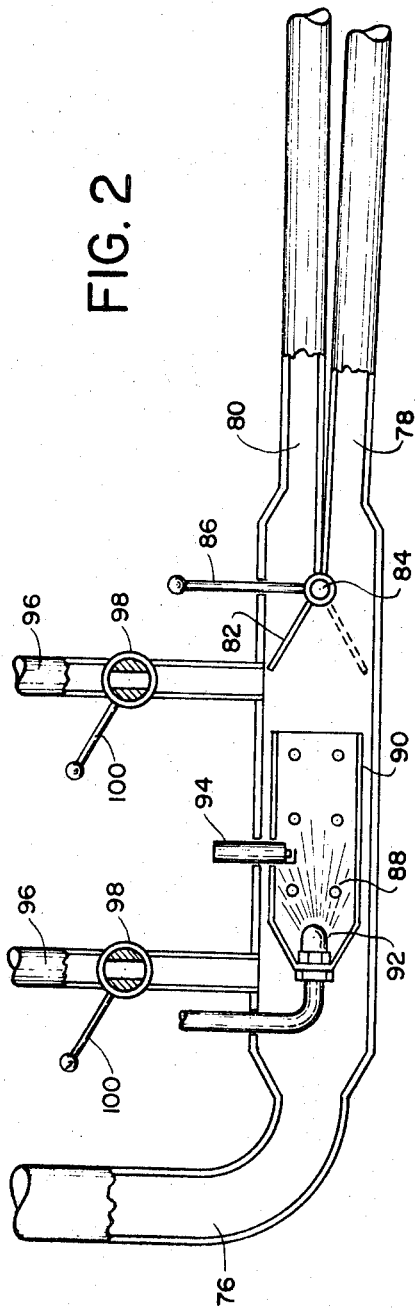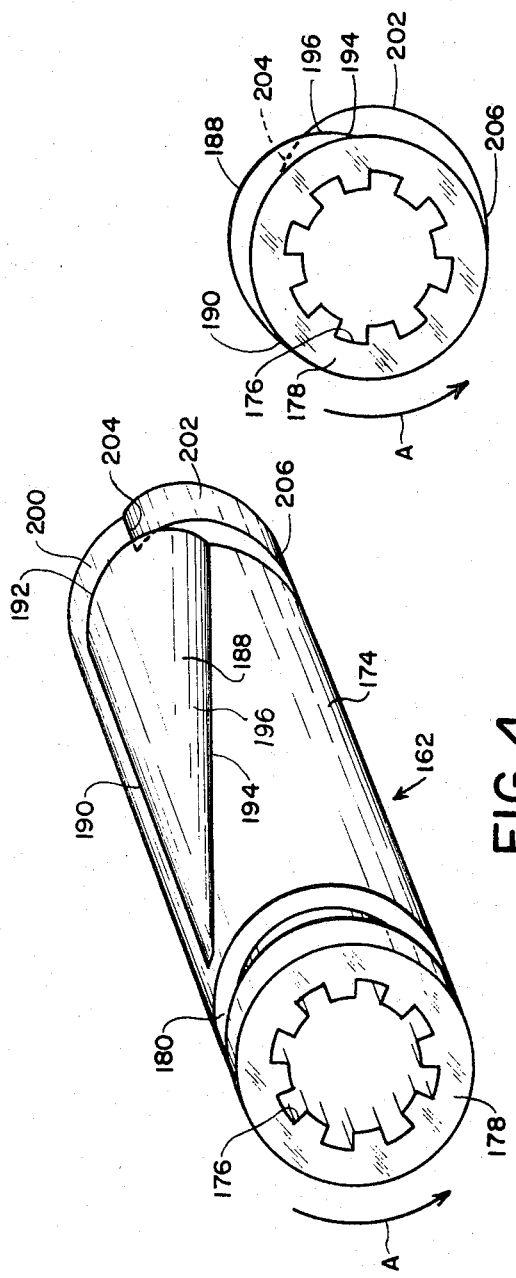

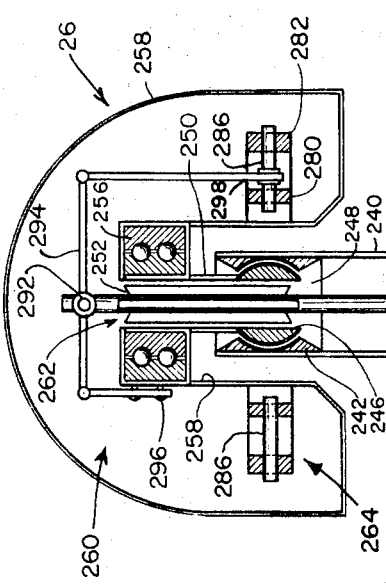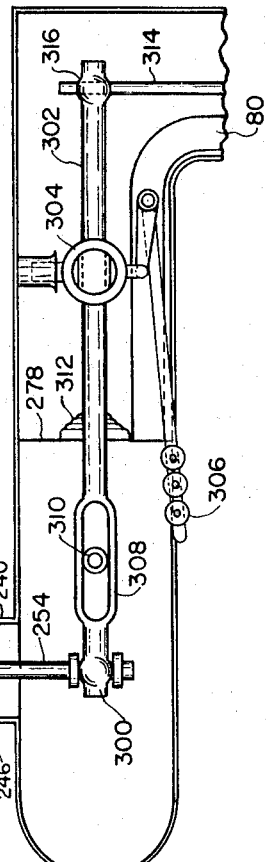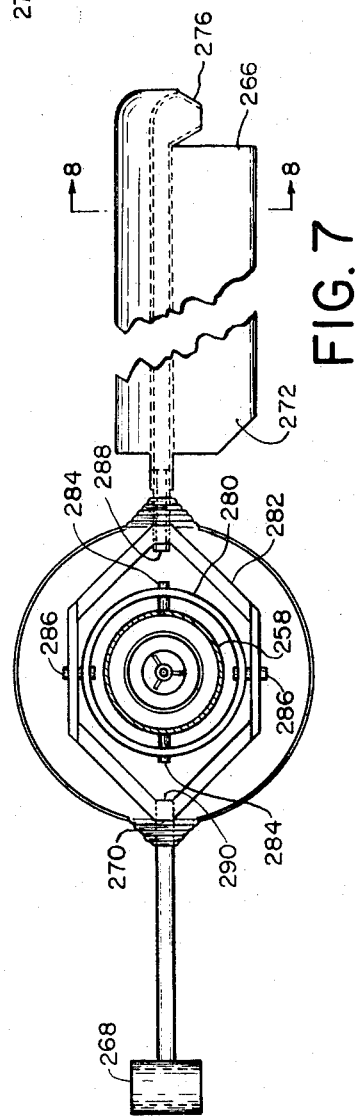

COMBINED LAND AND AIR VEHICLE

This application is a division of application Ser. No. 823,639, filed May 12, 1969, now Letters Patent No. 3,612,441.

The present invention relates to a combined land and air vehicle and particularly to combined helicopter and automobile powered by a single source of compressed air.

In the past two or three decades several proposals have been advanced for the construction of combined land-air vehicles, many of which employed hydraulic or pneumatic media as a power source. These proposals were by and large deficient in certain critical areas and they therefore did not meet with any degree of commercial success. Some of the deficiencies resulted from the use of separate power systems for each of the air and land functions, or the use of multiple movable dynamic connections in the conduit system whereby considerable power was lost before delivery to the thrusting devices, or, the locating of the various power systems in places which resulted in the creation of off balanced structures and severe aerodynamic instability, or, the provision of complex steering and control gearing which resulted in an overly complex and expensive vehicle.

It is the object of this invention to provide a simple, inexpensive vehicle easily convertible from land to air use and back and which will overcome the deficiencies of the prior art.

It is another object of this invention to provide a land-air vehicle employing a single source of power for both modes of travel, thereby materially decreasing the complexity of the vehicle. It is also desired to provide a vehicle having a common steering mechanism for both flight and ground operation.

It is still another object of this invention to provide a land-air vehicle using compressed air as the fluid power media. Such a media has a decided advantage, in that, only minor amounts of pollutants are produced, relatively little raw energy is required to produce the degree of pressure needed and it lends itself to easy manipulation.

It is another object of this invention to provide a land-air vehicle employing a novel pneumatic positive displacement motor for direct land operation. It being a specific object to provide such a novel pneumatic motor with novel means for manual and automatic throttling control.

It is another object of this invention to provide a novel jet propelled rotor means for propelling the craft in flight, including novel conduit connection from the air supply obviating the need for sealed links and dynamic joints.

It is another object of this invention to provide novel means for mounting a helicopter rotor blade and for controlling its pitch and tilt relative to the vehicle while the same is in motion whereby directional steering may be simply and easily accomplished.

It is still another object of this invention to provide a novel helicopter wherein the tendency of the vehicle body to turn under the torque of the rotor is eliminated, thereby excluding the need for anti-torque devices such as auxiliary rotors or tail structures.

It is, of course, the general object of this invention to provide an improved vehicle comprising the features of both a helicopter and an automobile, which is simple to construct, inexpensive and easy to operate. Also, it is an object to provide a vehicle which has adequate speed and range for modern travel requirement and which is relatively easy to maintain.

These objects and advantages, as well as others, will be seen from the description which follows. Briefly, however, the present invention employs a positive displacement compressor engine producing a supply of high pressure gas which may be fed either to a pneumatic motor which directly powers a drive wheel mechanism for land travel or to a jet propelled rotor mechanism which provides the flight operation. The pneumatic motor is controlled by a single movable cam by which its speed and power stroke are timed. The rotor mechanism is fed directly from the compressor by a single duct with a single dynamic seal and the reaction force of the jet propulsion system is directed against the rotor mechanism itself, therefore doing away with special structural features for the elimination of whipping and rotation of the vehicle itself.

For complete detail, reference is made to the accompanying drawings which, because of the nature of this subject, are largely schematic in form. It is believed that such representation presents the current invention without unnecessarily encumbering the description. In the drawings:

FIG. 2 is an enlarged sectional view of the burner mechanism shown in FIG. 1;

FIG. 4 is a perspective view of the cam control for the pneumatic motor;

FIG. 5 is an end view of the cam shown in FIG. 4;

FIG. 6 is an enlarged detail view of the rotor assembly;

FIG. 7 is a sectional view of the rotor taken along line 7—7 of FIG. 1;

FIG. 8 is a sectional view of the blade taken along line 8—8 of FIG. 7;

Figure 1:
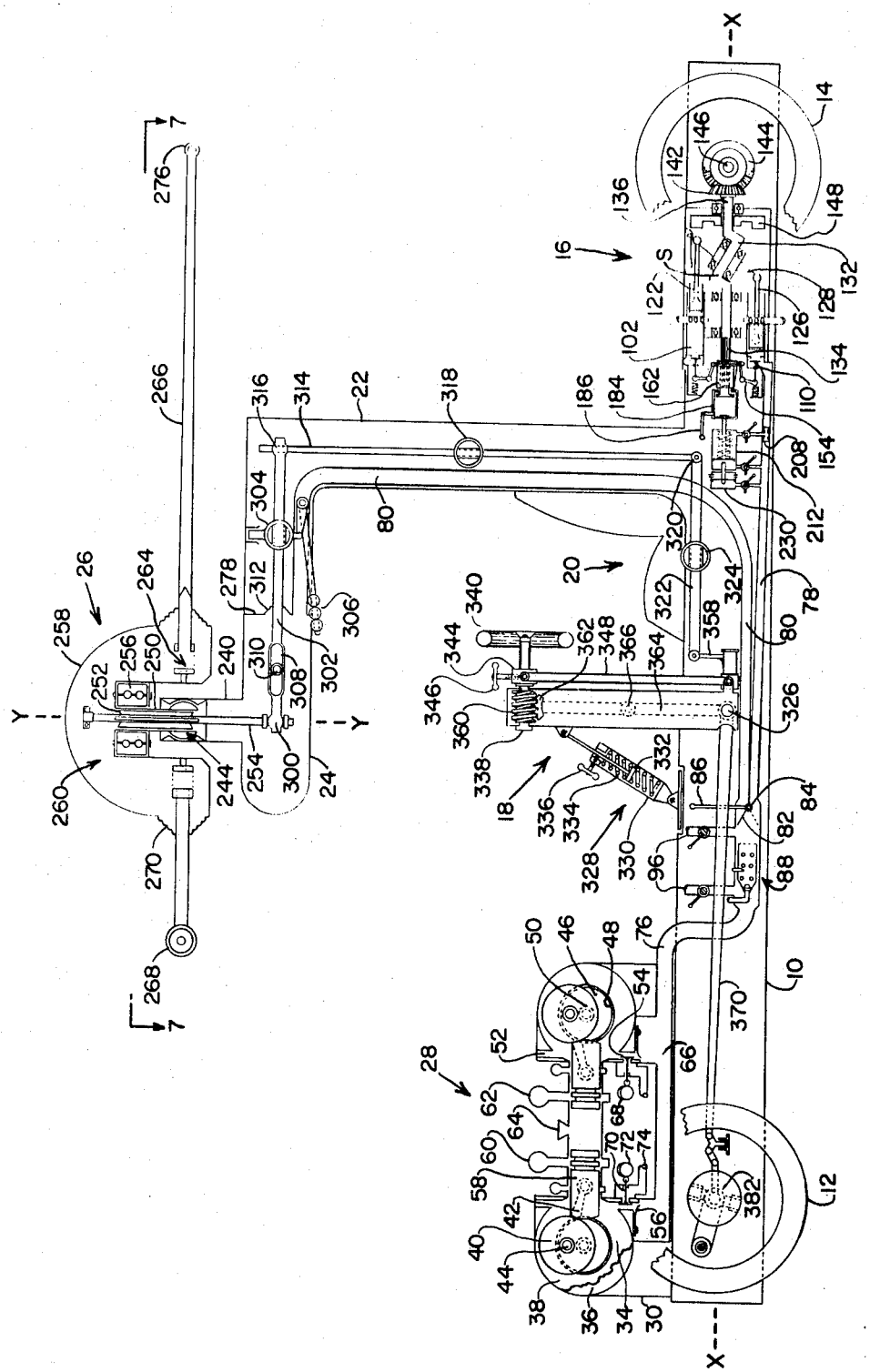
FIG. 1 is a vertical cross section of a vehicle embodying the present invention.

As seen in FIG. 1, the vehicle of the present invention is shown as being without body, shroud or other covering members. It will be apparent that conventional design techniques, common in either or both of the arts of land or air vehicles, may be employed, as desired, to provide a decorative as well as functional outer covering. Fundamentally, the present vehicle comprises, as part of its fuselage, an elongated chassis 10 to which is conventionally journalled, forward and aft, wheel assemblies 12 and 14. The wheel assemblies each comprise a pair of conventional rubber tired wheels, brake mechanisms, and suspension systems. The front wheel assembly is steerable while the rear wheels 14 are directly coupled to and powered by a reciprocating pneumatic motor, generally designated 16, mounted within the rear end of the chassis 10. Located midway of the chassis 10 is a vertical steering column 18 and an operator's cockpit 20 to the rear of whice rises a superstructure comprising a vertical standard 22 and a cantilevered standard extension 24 to which is journalled a jet propelled helicopter rotor assembly 26. A positive displacement rotary compressor engine 28, supplying the prime motive force for both the pneumatic (motor) 16 and the rotor assembly 26 is mounted at the forward end of the chassis 10.

The compressor engine 28 is substantially similar to the one shown in my U.S. Pat. No. 3,101,888 issued on Aug. 27, 1963 and is a self-contained device sufficiently capable of supplying the necessary compressed air to power both the pneumatic motor for ground operation and the helicopter rotor for air operation. While reference is made to the aforementioned patent for complete structural details and operating parameters, the compressor engine 28 will be briefly described herein, which, however, should not be deemed to be a limitation upon the scope of the invention. The actual construction of the compressor engine, for example, whether it be in-line or opposed, or operable on the two or four cycle principle, is immaterial and any of the embodiments, variants or modifications shown in the aforementioned patent will be operable in the present vehicle.

Specifically, there is illustrated in FIG. 1 a single unit of an opposed two-cycle compressor engine. It will be understood that multiple units of similar arrangement may be aligned, as taught by the aforementioned patent, to provide a multi-cylinder engine of any desired power. The compressor unit is contained within a housing 30 and comprises a cylinder or combustion chamber 32 opening at each end into a compression chamber 34 of cylindrical section closed by a front end wall 36 and a rear end wall 38.

Contained within each of the compression chambers 34 is a substantially circular compression member 40. The compression member 40 is materially smaller in diameter than the circular extent or diameter of the compression chamber 34 and includes as an integral part thereof, a vane 42. Both the compression member 40 and vane 42 are of the same length as the width of the cylindrically sectioned compression chamber 34. Each compression member 40 is centrally mounted on a crank pin 44 which is itself secured at each of its opposed ends to a small circular fly wheel 46 rotatably located in an undercut portion 48 formed in the respective end walls 36 and 38. The fly wheels 46 are provided with a stub axle 50 bearingly mounted in the end walls. In the event two or more compression units are aligned, the stub axles 50 may be connected together so as to link the aligned units in a crankshaft arrangement which may be likened in appearance to that of any well known engine.

Thus, the compression member 40 is connected to the fly wheel 46 so that the periphery of the member 40 will roll along the inner cylindrical surface of the compression chamber 34. With this arrangement, the compression member 40 and vane 42 when moved occupy the length and breadth of the compression chamber 34. The compression chamber is furnished with an air intake 52 and a compressed air outlet 54. The outlet 54 is provided with a flap type valve air lock 56 permitting one-way flow of air.

Connected to the ends of each of the vanes 42 is a piston 58 which fits into the opposite ends of the combustion chamber 32. Each piston 58 is formed to coincide with the contour of the combustion chamber and is provided with the usual piston rings, strips or other means to prevent gaseous by-pass and to insure an air tight sliding fit. The pistons 58 are arranged so as to be operable in opposed relationship and as in any positive displacement gasoline operated or diesel engine, there is provided a fuel intake port 60, a gaseous exhaust port 62 and ignition means 64. The particular form of the inlet and exhaust port and the ignition system are not detailed herein since reference to the aforementioned patent will provide the necessary structure and operating mechanisms.

Those skilled in the art will recognize that the structure and operation of the compressor engine may be likened to that of similar gas or diesel engines. Thus, upon initial firing and combustion of fuel in the combustion cylinder 32, both pistons 58 are forced outwardly and the compression member 42 is caused to rotate eccentrically with a small clearance against the inner surface of the compression chamber 34 by virtue of its connection with the vane 42 and fly wheel 46. As the compression member 40 and vane 42 rotate, they create within the compression chamber 34 constantly varying suction and compression compartments immediately behind and ahead, respectively, of the point of contact of the compression member 40 with the inner surface of chamber 34. As the rotation continues, the air in the progressively decreasing compression compartment increases in pressure and is eventually forced out of the chamber 34 through the one-way air lock 56 into a receiving chamber 66. On continued operation of the engine 28, the chamber 66 is provided with a steady, albeit, pulsating source of high pressure compressed air. To avoid the pulsating effect, multiple unit engines may be employed as indicated previously.

As shown in the aforementioned patent, the present engine also provides the compressed air outlet 54 with an air shunt mechansim 68 which will act as a throttle for the supply of compressed air to the chamber 66. The shunt mechanism 68 comprises a by-pass valve 70 cyclically operable through an adjustable cam mechanism 72. The valve 70 may be caused to open a passage between the compressed air outlet 54 and a shunt conduit 74 to bleed off the desired selected amount of air prior to its compression and passage into the chamber 66 to thus regulate the volume of air passed thereto. By causing all of the fluid to pass through the shunt 68, the engine 28 may be idled without activating either the pneumatic motor 16 or the helicopter rotor 26. The vehicle can, therefore, be maintained in "neutral" merely by operating a single valve and without effect on the prime power source, the rotor or the pneumatic motor.

The compressed air is thereafter passed from the receiving chamber 66 to a diversion conduit 76 where it may then be selectively shunted or diverted to either the motor 16 or rotor 26. For convenience, the diversion conduit 76 is provided with a pair of branch conduits 78 and 80 arranged in a Y formation. As seen in detail in FIG. 2, a rigid flap 82, preferably of metal or other substantially non-flexible, heat resistant material, and of a size conforming to the interior of the terminal section of the conduit 76, is secured at the juncture of the conduits 78 and 80. The flap 82 is mounted on a rotatable shaft 84 and is movable to selectively cover the entrance of either of the delivery conduits 78 and 80 thereby blocking the flow of compressed air from one and directing it into the other. Secured to the end of shaft 84 is a handle 86 which is provided with appropriate linkage (not shown) to the cockpit to permit the operator to easily manipulate the flap 82. Thus, the operator may alternate the compressed air flow to either the pneumatic motor 16 or the helicopter rotor 26 as desired.

Within the diverting conduit 76 just prior to its terminal section is located an auxiliary gas heater 88 comprising a foraminous burner housing 90, a fuel nozzle 92 and an igniter mechanism 94. The auxiliary heater 88 is provided with conventional control mechanism located in the operator's cockpit whereby the operator may selectively heat the compressed air produced by engine 28 to prevent icing conditions in the operation of the jet rotor or give extra power as may be required. This unit raises the temperature of the moving compressed air, thereby increasing its volume by expanding its molecular activity. The increase thus provides greater moving capacity and/or energy.

A pair of ducts 96 lead into the diverting conduit 76 and are located so that one precedes and one floows the gas heater 88 in the direction of flow of air through the receiving conduit. Each duct is provided with a ball valve mechanism 98 and stick control 100 which, with appropriate linkage, can be made to extend into the operator's cockpit for direct manual control.

The vehicle may be provided with auxiliary mechanisms requiring compressed fluid for operation such as a jet nozzle to cause the vehicle to yaw in direction or by directing air to the exhaust manifold of the prime mover to completely burn the products of combustion and thus control pollutants or for airconditioning or for power tools, etc. One of the ducts 96 may, therefore, be used to feed compressed air from the diverting conduit 76 to that mechanism.

The compressed fluid thus produced in the engine 28 can be fed through one of the delivery lines 78 and 80, or ducts 96, at the selection of the operator to power the pneumatic motor 16 or the jet propelled rotor assembly 26 or any of the auxiliary mechanisms.

Figure 3:
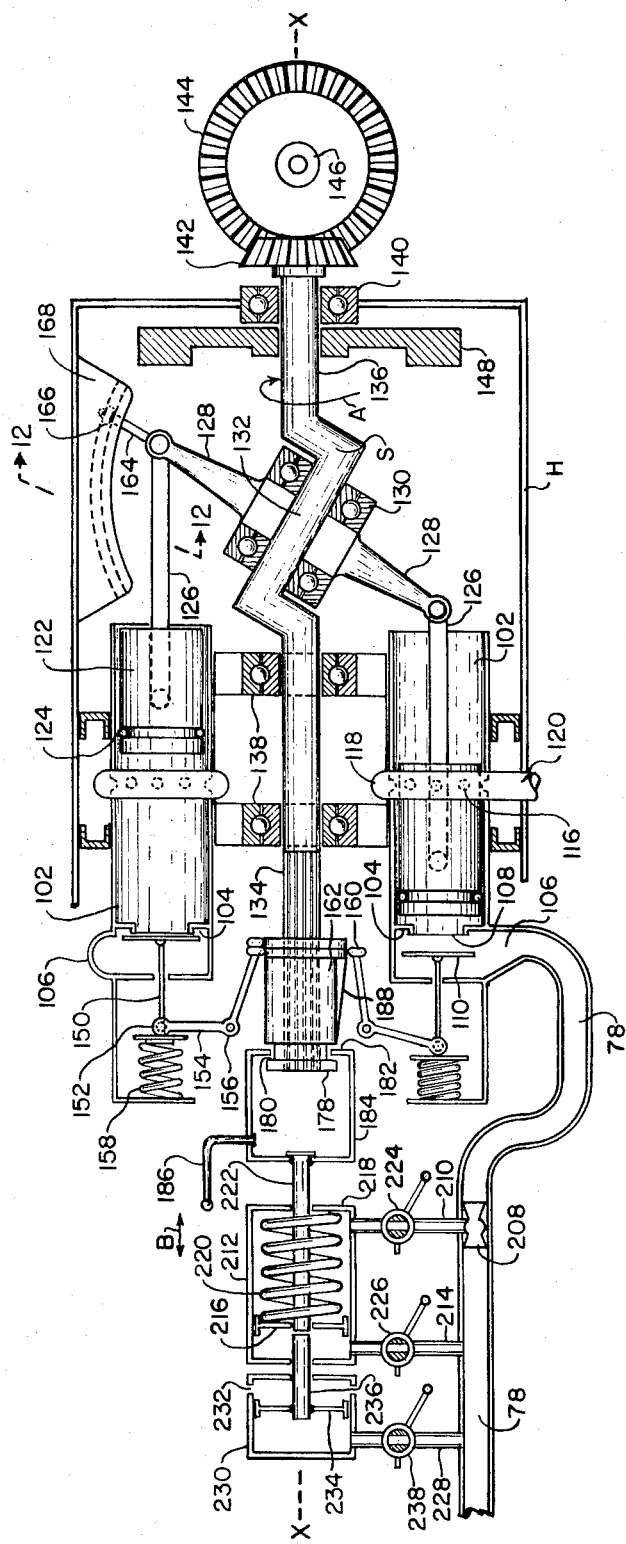
FIG. 3 is an enlarged detail of the pneumatic motor employed for land operation.

Let us consider first the operation of the pneumatic motor 16 and the ground mode of travel. Referring to FIGS. 1 and 3, the motor 16 comprises a positive displacement, single acting, reciprocating motor directly powered by a uni-directional flow of compressed air having a plurality of cylinders 102, similar to those employed in conventional reciprocating gasoline engines. Only two cylinders 102 are shown here for illustration, although for self-starting operation at least three may be required. The cylinders 102 are located within a suitable housing H mounted to the chassis 10 and are uniformly arranged about a Z-shaped crankshaft S disposed generally along a central axis X. Each cylinder 102 has an enclosed head 104 shrouded by a common manifold 106 directly connected to the delivery conduit 78. Located in each head 104 within the manifold 106 is an admission or inlet port 108 provided with a lift valve 110 through which the compressed air may be admitted. Midway along the length of the cylinder 102, there is provided a series of radial holes 116 covered by shroud 118 leading to a common duct 120 for rapid exhaustion of air from the cylinder interior. Within the interior of each cylinder is a piston 122 furnished with conventional sealing rings 124 permitting free movement without by-pass of air. A rod 126 extends from the rear of each piston 122 and is linked through an articulated connection 128 and a collar 130 to the center section 132 of the Z-shaped crankshaft S. The pistons 122 are adapted to cyclically reciprocate in a forward exhaust stroke and a rearward power stroke on the timed and sequential operation of the inlet lift valves 110 admitting air to the cylinders 102. On the rearward power stroke the pistons alternately force the crankshaft to rotate about the axis X. The crankshaft carries each piston forward during the exhaust stroke to exhaust the air from the cylinder.

The admission valve 110 is usually open for only a fraction of the cycle (under normal running) and is closed for most of the cycle including the return of the piston 122. During such return, should any excessive compression build up within the cylinder 102, the lift valve 110 will automatically raise since it opens outwardly into the manifold chamber 106 and permits such compressed gas to mix with the incoming gas. Consequently, relief valves, etc. are not required and there will be no loss in efficiency of the motor. This is, of course, possible as a result of the structural relationship between crankshaft S and pistons 122 which allows the cylinder in the power stroke (receiving air from the manifold 106) to exert greater turning force on the crankshaft than any resistance created in the other cylinder by the return stroke.

The crankshaft S lies entirely in a common plane, and in addition to the center section 132 comprises an axial forward section having a splined end 134 and an axial rearward section 136. The forward spline section 134 is supported in a pair of bearing blocks 138 mounted between the cylinders 102 and the rearward section 136 is supported in a bearing block 140 mounted to the housing H. The rearmost end of the crankshaft is provided with a bevel gear 142 adapted to mesh with a corresponding gear 144 secured to the transverse axle 146 of the wheel assembly 14 (see FIG. 1). Adjacent the rearmost end of the crankshaft S is secured a fly-wheel 148 which smooths out the pulsations and produces an even flow of power. The cylinders and the engine and the valve mechanisms are so timed that when the cam is at its highest and longest point of lift, inlet valve will alway be in the open position permitting air into cylinder and applying pressure on piston thus preventing any point of inoperability. In this case, the pneumatic motor being directly attached to the rear wheels with gearing, the position of the flywheel will vary according to the position the rear wheels are in when the vehicle stops. Consequently, the flywheel is not depended on to maintain the crankshaft out of position of dead center and while it assists in this function, its operation is mainly to provide a smooth running motor.

In the embodiment depicted, the rotation of the crankshaft S, for forward vehicular movement, is clockwise about the central axis X, as indicated by the arrow A. Therefore, the flywheel 148 is arranged to effect a normal tilting of the plane of the crankshaft in this clockwise direction. Because of the interconnection of the crankshaft with the piston and valves, they, too, are maintained out of balance or equilibrium. Those skilled in the art will find such an arrangement very similar to that which is employed in conventional reciprocating engines. It is necessary, however, to point out that, in at least one respect, the pneumatic motor 16 differs from other conventional pneumatic motors. Here the usual gear mechanisms or reverse flow valve and piping, for changing direction or speed are omitted and such changes are effected only (as will be described) by the selection of the sequence or timing of the supply of compressed air to the cylinder 102. Therefore, somewhat more accuracy is required in positioning and setting the various elements to avoid any "dead centering" with respect to any cylinder.

The lift valve 110 is furnished with a stem 150 connected to one end 152 of a bell crank 154 which is pivotally mounted at 156 to the housing H. A compression spring 158, located between the housing H and the end 152, biases the bell crank 154 and consequently causes the lift valve 110 to maintain a normally closed position. However, the free end of the bell crank 154 is provided with a cam rollr 160 which is adapted to engage and pass circumferentially across the surface of a contoured cylindrical cam 162 mounted on the splined end 134 of cranksshaft S. The cam 162 is designed to pivot the bell crank 154 and thus move the lift valve 110 from the seat of inlet port 108.

Figure 12:
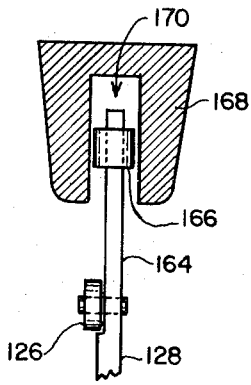
FIG. 12 is a sectional view taken along line 12—12 of FIG. 3.

To prevent the piston rods from twisting and themselves rotating about the axis X, the connecting arms 128 are provided with an outward extension 164 to which is mounted a freely rotatable roller 166. The arm 164 and roller 166 lie along the axis of the connecting arm 128, the roller 166 engaging within a U-shaped guide rail 168 secured to the motor housing H, as seen in FIG. 12. Thus, the roller rides within the channel 170 formed in the U-shaped guide member 168 as the piston rods 166 reciprocate the connecting arms 128 fore and aft.

The contoured cam 162, as seen in detail in FIGS. 4 and 5 comprises a cylindrical member 174 which has a keyed central bore 176 adapted to fit over the spline 134 to be axially movable thereon as well as conjointly rotatable. The forward end of the cylindrical member 174 is provided with a head 178, beneath which is formed a peripheral groove 180 into which is loosely fit the lip 182 of a cylindrical cage 184. Attached to the cage 184 is an elongated control arm 186, preferably linked to cockpit 20, which is manually reciprocable, as indicated by arrows B, to effect the axial movement of cam 162 on the spline 134.

As seen in detail in FIGS. 4 and 5, the cam body 174 is provided with a triangularly shaped shelf 188 conforming to the curvature of the surface of the member. The shelf 88 comprises a base 190 extending parallel to its longitudinal axis substantially from the groove 180 to a point short of its rear edge, a vertical leg 192 extending normal to the base 190 for about a 120° arc about the circumference of the member, and a side 194 extending as a hypotenuse from the end of the leg 192 to the base 190. The edge of the hypotenuse side 194 is inclined, as seen by numeral 196 in FIG. 5, to provide a smooth transitional surface for the cam roller 160. The edge of the base 190 is provided with a somewhat sharper yet inclined surface to permit a more abrupt transition for the cam roller. The leg 192, on the other hand, is sharp and perpendicular insuring an abrupt and positive drop from the cam surface.

As will be seen more clearly from FIG. 3, the shelf surface 188 is inclined upward from front to the rear. At the groove 180, the shelf is barely higher than the surface of member 174 but, at the rearward end (i.e., near the leg 192) the shelf 188 is of considerable height. Since the elevation of the shelf 188 causes the bell crank 154 to move against the spring 158 and consequently raise the lift valve 110, the distance of the lift valve 110 is raised will depend upon the axial location of roller 160 on the shelf and may consequently vary from zero to the maximum height of the shelf 188. The axial location of the roller 160 also determines the period of time the lift valve 110 is raised since the bell crank 154 remains in pivoted position during the entire circumferential traverse of the roller 160 across the shelf 188. Since the shelf 188 never exceeds an arc of 120° of the cam 162, each of the valves 110 can only be raised from the inlet port 108 for, at most, only a third of the revolution of the crankshaft cycle. Because of this, the pistons 122 are pressurized in sequence and for a set period of time. As seen in the drawing only two pistons are shown, one piston is in the exhaust period while the other is in the power period. Since the shelf 188 widens circumferentially in a continuous manner from 0°, at the groove 180, to 120° at the leg 192, cycling of admission of power is in direct relationship to the extent the lift valve 110 is raised and is controlled together with it by the shifting of the cam 162 axially on the crankshaft.

As motor 16 is started, it is necessary to supply the pistons with large volumes of compressed air since they are required to exert a considerable torque to overcome the inertia of the crankshaft S. This is accomplished by movement of rod 186 forwardly, thereby causing the cage 184 to carry the cam 162 forwardly along the spline 134 positioning the cam 162 with the widest portion of the shelf 188 in rolling contact with the cam roller 160. The bell crank 154 is thereby caused to open the lift valve 110 the greatest distance for the longest period possible. As the pneumatic motor 16 turns over and the crankshaft S rotates, gaining momentum, less power is required. The control rod 186 is moved rearwardly, thereby shifting the cam 162 to place a narrower portion of the shelf 188 in contact with the cam roller 160, decreasing the time and degree of opening of the lift valve 110 as desired. Thus, by simply manipulating the position of the cam 162 on the crankshaft spline, the operator can effect power throttling of the pneumatic motor 16. This is to be distinguished from the previously described means for throttling the supply of compressed air from the compressor engine 28 as by control of the shunt valve 70 or the heater 88 which, as will be appreciated, does not effect the operation of the motor 16 to the same degree. Later, there will be described automatic means for power throttling which is responsive to the speed of the motor.

The cam 162 is, of course, located with respect to the plane of the crankshaft to provide for the opening of the lift valve 110 in phase with and only when the respective piston has completed its exhaust stroke and has returned to a condition closest to the head 104 of the cylinder. At this point the flywheel 148 is also located to maintain the crankshaft S out of "dead center." In this manner, the piston 122 is driven rearwardly by the force of the incoming compressed air through a complete power stroke and effects full force on the crankshaft S in the direction in which the flywheel predisposed it. Since the cam 162 is rotated conjointly with the crankshaft S, once rotation is effected and a continued supply of compressed air is made, the system will be self-perpetuating. That is, the timing of the valves and cycling and the phasing of the piston of the system will cause the respective power and exhaust strokes to continue indefinitely to rotate the crankshaft in the direction of inertial predisposition.

In the absence of gearing mechanism for effecting reversal of direction, the motor 16 must itself be placed in reverse. It is noted that the cam shelf 188 terminates short of the rearward end of the cylindrical member 174, thus leaving it with a neck-like extension 200. The neck 200 is made preferably only wide enough to comfortably accommodate the cam roller 160 and is furnished with a raised platform 202 similar in cross section (FIG. 5) to that of the shelf 188 except in reverse. The platform 202 is provided with an incline 204 located on the circumference of the cam member 174 so that it overlaps to some degree the inclined edge 196 of shelf 188. Thus, should the cam roller 160 be axially shifted from the shelf 188 to the platform 202, there would be an instantaneous break in the motor cycle, placing one of the lift valves 110 out of phase with respective piston. Consequently, one of the admission ports 108 would be opened to allow compressed air into the cylinder 102 during its piston exhaust stroke rather than when it had fully completed that exhaust stroke. This out of phase admission of power will, of course, occur when the crankshaft is in that part of the cycle where the weight of the flywheel 148 is oppositely located to its inertial position, being titled in the clockwise half of its cycle about the central axis. At this point, the out of phase admission of compressed air creates an out of phase power stroke on an out of phase crankshaft, resulting in a torque on the crankshaft, contrary, (i.e., counterclockwise) to its initial revolution, thereby immediately reversing the rotation of the crankshaft. The shelf 202 is also provided with a sharp edge 206 so that the repetitive phases of the piston strokes are, in their reverse direction, virtually identical to those of the forward direction. Therefore, continued reverse operation proceeds as in the previously described cycle and continues until the cam 162 is shifted back along the spline 134 to where the cam roller 160 rides on shelf 188 returning the motor 16 to forward movement. Even when motor 16 comprises more than three cylinders, it is necessary to break into a piston cycle to reverse the operation. The cam 162 may be fashioned so that the platform 202 merely reverses or charges the order in which the respective cylinders or pistons are pressurized.

The throttling of the motor 16 has been described so far as a manual function. Automatic throttling and reversal of the motor 16 is effected by making the movement of the cam 162 directly responsive to the flow of compressed air through the conduit 78 so that it will shift along the spline 134 of the crankshaft without manual direction in direct response to the variance in power supplied from the compressor engine 28. A venturi device 208 is placed in conduit 78 and is adapted to have all of the compressed air, passing from engine 28, flow through it. Extending from the venturi is a duct 210 leading to the rear end of sealed chamber 212 which is placed axially adjacent to the cage 184. Extending from the forward end of the chamber 212 is a second duct 214 which leads back to the delivery conduit 78, ahead of, or upstream, of the venturi 208. Chamber 212 is fitted with a piston-like device 216 which is resiliently spaced from its rear wall 218 by a spring 220. The piston 216 is furnished with a rod 222 slidably sealed and extending axially through the rear wall 218 into fixed engagement with the cage 184.

Both ducts 210 and 214 are provided with three-way valves, 224 and 226, respectively, by which flow of air may be regulated therethrough. It will be appreciated that flow of compressed air through the venturi 208 will create a differential in pressure in ducts 210 and 214 resulting in the drawing of a vacuum on the spring side of piston 216 and the creation of a positive pressure on the face of the piston 216 directly proportional and responsive to the speed and volume of compressed air flowing in the duct 78. Consequently, as motor 16 increases in speed and/or the flow of air from engine 28 increases, the differential will force the piston 216 rearwardly overcoming the bias of spring 220. The cam 162 will thus be caused to shift in a corresponding manner. Conversely, as the motor 16 decreases in speed and/or air flow from engine 28 lessens, the differential between ducts 210 and 214 spring 220 will move piston 216 and ultimately cam 162 forwardly. The use of the two three-way valves 224 and 226 when opening ducts 210 and 214 to duct 78 insures reaction on both sides of the piston during even small variances in pressure differential making the pneumatic motor 16 more responsive to the supply of energy and therefore smoother operating. The valves 224 and 226 permit disconnection of automatic operation without effecting the flow of compressed air. Also, by venting both valves 224 and 226 manual operation through control rod 186 can be effected without any residual drag from the piston 216.

Reverse operation is automatically effected through a secondary apparatus comprising a third duct 228 located further upstream from duct 214 which leads into a second chamber 230. The second chamber 230 is provided with a plurality of air vents 232 and a piston 234 having a rod 236 extending out of its rear end which extends into the sealed first chamber 212 so as to be in contact with the fact of the primary piston 216. The secondary system is also provided with a three-way valve 238 which is normally open so as to pressurize the chamber 230 to normally maintain the rod 236 in position against the primary piston 216. Thus, the primary piston is prevented from moving sufficiently forward to carry the cam 162 into its reverse position relative to the cam roller 160. This condition is effected so long as valve 238 is open to duct 78 and no matter what condition the primary three-way valves 224 and 226 are in. Further, the chamber 230 may be locked under pressure with the rod 236 in extended position merely by closing valve 238. Reverse operation is, however, obtained when the three-way valve 238 is opened so as to vent chamber 230 to atmosphere, negating the functioning of the secondary piston 234. Thereafter, should the primary valve 226 be also vented, the force of spring 220 will operate to move the primary piston 216 to an extreme forward position, thus shifting the cam 162 into its reverse location.

The three-way valves 224, 226 and 238 are all provided with control levers linked in conventional manner to the cockpit area so as to be easily manipulated by the operator. These links may also be provided with various interlocking mechanisms which provide for positive shifting from forward to reverse or back by manipulation of a single mechanism rather than requiring the operation of two or more valves. Conventional servo mechanism, relays and low power motors may be used to this end.

Having now described the structure and operation of the mechanism effecting land operation, we can turn to a description of the rotor assembly 26 and its function.

Returning to FIG. 1, it will be recalled that the rotor assembly is cantilevered over the vehicle on a vertical standard 22 and extension 24. The standard 22 and the extension 24 are hollow and preferably of tubular shape, although a rectangular frame is equally suitable and should provide the needed strength and pleasing appearance. The rotor assembly 26 is mounted on a tubular vertical post 240, the center of which defines the vertical axis Y of the vehicle. This axis Y is perpendicular to the horizontal axis X and intersects it at what constitutes the center of gravity of the vehicle. It will be observed that the various components of the vehicle are balanced about the center of gravity and the two axes providing considerable stability and behavior characteristics.

The vertical post 240 is integrally connected to the extension 24 and is provided at its interior upper end with a socket 242 of a universal spherical joint 244. A cooperating ball member 246 completes the joint 244 and is provided with a bore 248 from which extends an integrally connected tubular rotor hub 250 furnished with a plurality of inwardly directed fins 252. The fins 252 run substantially the entire length of the rotor hub 250, however, their radial inward extent is just short of the center axis, providing an axial passage within which is located an elongated control rod 254 engaging the edges of fins 252. In a manner to be shortly explained, the control rod 254 is adapted to move linearly within the passage of the rotor hub 250 and azimuthally about the axis Y. Because the control rod 254 engages the fins 252, its azimuthal movement causes the rotor hub 250 to pivot about the spherical joint to assume a tilt angle, or azimuth, anywhere within a 360° radius of the vertical axis Y. The he or direction taken by the craft during flight is basically a consequence of the tilt angle or azimuth taken by the rotor hub 250. For example, a forward tilt will influence the craft forwardly while a rearward tilt will influence it to go rearward. Coupled with the pitch or angle of attack of the blade 266, the vehicle moves upwardly or downwardly in the direction created by the tilt angle.

To the exterior upper end of the rotor hub 250 is secured, by conventional means, the inner race of a ball bearing 256. Mounted to the outer race of the ball bearing 256 is a rotor housing 258 of generally domed or hat-shaped to provide an enlarged hollow interior chamber 260 and to be relatively symmetrical for balanced rotary movement about the rotor hub 250. The housing 258 is generally sealed so as to be air tight and has a central opening 262 aligned with the tubular rotor hub 250 so that its hollow interior 260 is adapted to communicate with the fixed lower vertical post 240 and consequently with the standard extension 24. The rotor housing 258 is furthermore mounted so that its mass and therefore its center of gravity is well below the ball bearing 256, preferably at the level of the spherical joint 244. Mounted with the rotor housing 258 is a gimbal mechanism 264 to which is secured a rotor blade 266 and counter weight 268. Control of the gimbal mechanism 264 modifies the pitch of the blade 266 and its angle with respect to azimuth axis taken by the rotor hub 250. Both the blade 266 and the counter weight 268 are externally sealed by suitable flexible boots 270 preventing the escape of air but permitting full freedom of movement.

As seen more clearly in FIGS. 7 and 8, the blade 266 extends substantially horizontally from the rotor housing 258 and is fashioned somewhat in the shape of an airplane wing having elongated foil surfaces 272 provided with the usual cross sectional curvature to obtain maximum lift and minimum resistance. Extending from the housing 258 and in communication with its interior 260 is a tubular conduit 274 forming the structural backbone and longitudinal axis of blade 266. A jet propulsion nozzle 276 is connected with the conduit 274 at the tip of the blade 266. The nozzle 276 is adapted to receive air passed through the blade conduit 274 and is adapted to discharge tangentially and rearwardly with respect to the counter-clockwise rotation of the blade. With reference to the earlier description of the compressor engine 28, it will be recalled that the compressed air generator therein was adapted to be diverted into conduit 80 for delivery to rotor assembly 26. It will now be seen that conduit 80 extends through the standard 22 and extension 24 terminating short of the lower vertical post 240 to thereby deliver the compressed air directly to the rotor housing chamber 258. The terminus of conduit 80 is set in a seal member 278 dividing the extension 24 so as to maintain the integrity of the rotor chamber and prevent blow-by of the compressed air. The compressed air, produced by the engine 28, is fed with substantially little loss of pressure through the lower post 240, the rotor hub 250, the interior housing chamber 260, and the rotor conduit 274 to the tip of the blade where it is forcibly ejected through nozzle 276 causing the blade to rotate about roller bearing 256.

The jet nozzle 276 may be of any of the conventional easily obtainable variety but should preferably be of the type which substantially multiplies the force and pressure of the compressed air as it is ejected so as to produce the necessary thrust to rotate the blade 266 with sufficient angular speed to provide air lift. It will be noted that no valves, dampers or other throttling means are provided for controlling the flow of air beyond those controls provided in the compressor engine 28 itself and in the receiving conduit 76. Consequently, the pneumatic operation of the rotor is simple, direct and most efficient, utilizing all of the fluid pressure supplied to it. The construction requires only a single dynamic seal, namely, the ball bearing 256 and may be easily streamlined. Further, the structure may without material modification employ two or more rotor blades of similar form if desired. It will also be noted that the delivery of compressed air to the rotor creates no reaction or back propulsion in the vehicle. Thus, the vehicle is not subjected to the influence of whipping or torque reaction commonly found in other helicopter vehicles. As a resultant advantage, it is not necessary to provide the vehicle with a tail mechanism or other anti-torque devices.

Figure 9:
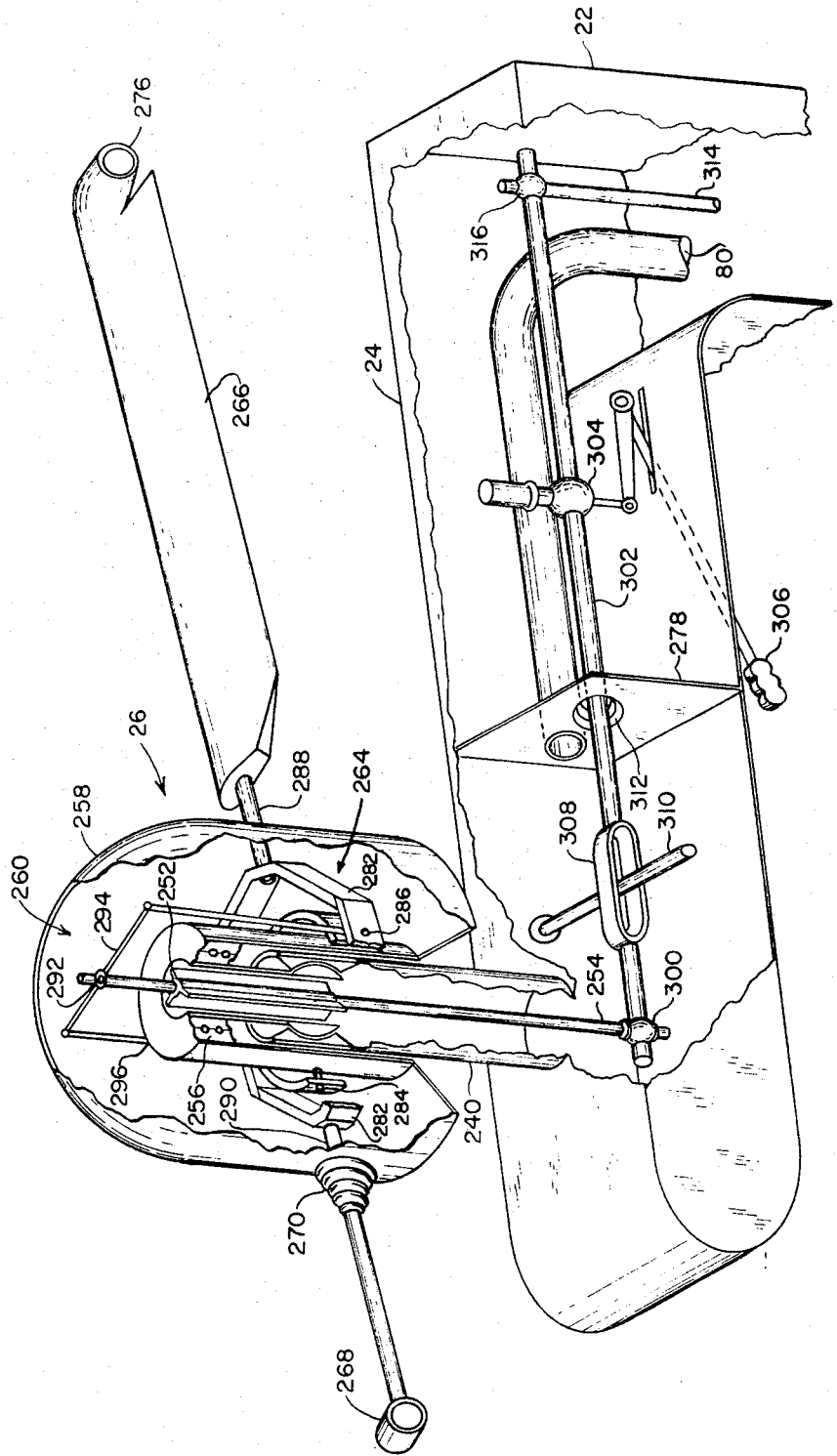
FIG. 9 is a perspective view of the rotor assembly partially sectioned.

It had been noted that the attitude of the vehicle during flight is dependent on the pitch of the rotor blade 266. This is effected through operation of control rod 254 on the gimbal 264 as well as on the rotor hub 250. The gimbal 264 (FIGS. 7 and 9) comprises an inner ring 280 and a concentric outer ring 282 located in a plane generally perpendicular to the axis of the rotor hub 250 and substantially at the level of the universal spherical joint 244. The inner ring 280 is pivotally secured to the inner wall of the rotor housing 258 by gimbal studs 284 which are mounted in alignment with the axis of the blade 266. The outer ring 282 is secured to the inner ring by gimbal studs 286 which are mounted transversely to the axis of the blade 266 or 90° offset from the inner ring gimbal studs 284. The blade 266 and counterweight 268 are provided with hollow stud shafts 288 and 290 respectively, which are secured to the outer ring 282 also in axial alignment with the inner ring gimbal studs 284. It will thus be seen that on pivoting the inner gimbal ring 280 about its studs 284, the blade 266 can be made to rotate about its own axis and thereby change its pitch or angle of attack relative to its direction of movement. Pivoting the outer gimbal ring 282 about its pivot studs 286 will cause the blades 266 and counterweight 268 to see-saw with respect to the azimuth axis of the rotor hub 250.

The upper end of the control rod 254 is connected by a floating ball joint 292 to the center bar 294 of an articulated three-bar linkage having one end 296 fixed to the interior wall of housing 258 and the other end 298 fixed to the gimbal stud 286, holding the outer ring 282 to the inner ring 280 on the diametrically opposed side. It will be observed that should the control rod 254 be moved in its axial direction, (i.e., up or down within the rotor hub 250) the three-bar linkage would effect a pivoting of the entire gimbal about the inner studs 284 modifying the pitch angle of the blade 266. Should the control rod 254 be pivoted or swung like a freely hanging pendulum, forward or aft or sideways, in azimuthal directions, it would effect pivoting of the rotor hub 250 about the spherical joint 244, thereby tilting, in a corresponding manner, the rotor housing 258. However, during the latter movement of the rotor housing 258, the axis of rotation of the rotor blade 266 tilts away from the azimuth axis of the rotor hub 250 and is maintained in a plane substantially perpendicular to the ground or parallel to the vertical axis Y. This occurs because the balance between the blade 266 and the counterweight 268 causes the outer gimbal ring 282 to see-saw about its outer studs 286. Since the intersection of the vertical axis Y and the horizontal axis X constitutes the center of gravity of the vehicle. The tilting of the plane of rotation of the blade compensates for the actual tilting of the vehicle caused by the displacement of the rotor housing, thus maintaining the vehicle's stability and aerodynamic maneuverability.

Returning to FIG. 1, the control rod 254 is connected via a ball joint 300 to a link 302 set within a spherical swivel or bushing 304 secured within the extension 24 and is movable by operation of a hand lever 306, conventionally mounted to the extension 24. An up or down pivotal movement of the lever 306 is translated via the bushing 304 and transverse pin 310 into a corresponding linear movement of the control rod 254 causing the three-bar linkage to modify the pitch of the blade 266, as previously explained. The link 302 is provided with a horizontally split portion 308 within which is located transverse pin 310 which cooperates and permits the link 302 to move forward and backwards and sideways and still maintain a pivot point for linear movement. A boot 312 is provided about the link 302 to seal it within the dividing wall 278 to maintain air tight integrity of the rotor housing 258.

The link 302 is connected to a vertical link 314 via a universal collar 316 which permits the latter link to slide with respect to the former. The vertical link 314 is mounted by a pivotal spherical bushing 318 within the vertical standard 22 and is joined by a ball joint 320 to a lower horizontal link 322 mounted within still another pivotal spherical bushing 324 in the vehicle chassis 10. The lower link 322 is connected to the steering mechanism (to be described) so as to linearly reciprocate as well as to swivel in a horizontal plane about the spherical 324. As a result of this form of linkage, the forces placed on the lower link 322 is translated to the upper link 302 in direct correspondence. Consequently, the upper link can be made to reciprocate fore and aft and swivel side to side in a horizontal plane about its bushing 304. Both movements result in a tilting of the rotor hub 250 azimuthally about the vertical axis Y and when combined can cause the hub 250 to tilt in any desired direction. For obvious reasons, structural limitations will and must be placed on the ability of tilting the hub backwards as by limiting the extent of linear reciprocation of the link 322 so that the rotor blade 266 will not come into contact with the vertical standard 22.

Figure 10:
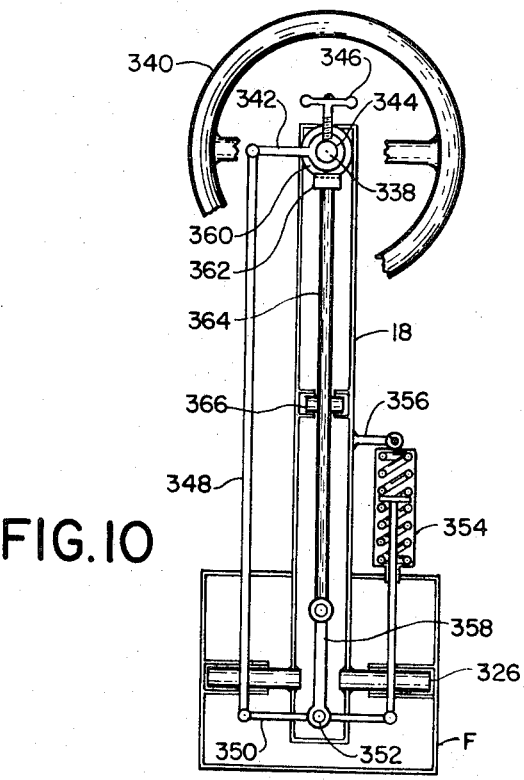
FIG. 10 is an enlarged view of the steering column of FIG. 1.

The link 322 is operated by a steering mechanism mounted to the steering column 18 which comprises a vertical hollow frame pivoted at its lowest extremity about a horizontally and transversely disposed axle 326. As seen in FIG. 1, the steering column 18 is resiliently supported in normally upright position by a dampening device 328 angularly positioned between it and the forward portion of the vehicle chassis 10. The dampening device 328 comprises a cylinder 330, a piston 332 and a spring 334 mounted within the cylinder to act on both faces of the piston 322. The relative positions of the spring 334 and piston 332 may be adjusted by conventional means to effect a variable bias on the piston and thus create a drag on the pivotal movement of the column 18 in both directions. The dampening device 328 is provided with a locking mechanism 336 preferably of the turnknob variety although other varieties may be employed by which the piston 332 may be secured preventing movement. Mounted at the top of the column 18 is a rotatable shaft 338 at the end of which is secured a steering wheel 340. A laterally extending rod 342 (FIG. 10) is connected to the shaft 338 by a loosely fitting collar 344 which is provided with a turnknob lock 346 by which it is selectively secured to the shaft 338. Pivotally connected to the end of the lateral rod 342 is a vertically depending rod 348 which is pivoted at its end to a transverse horizontal pivot beam 350 fulcrumed at its center 352, forming a four bar parallel link whereby rotation of the wheel 340 will be translated into a corresponding movement of the beam 350. The movement of the beam 350 is dampened by a spring loaded dash pot 354, similar in construction to the dampening device 328 employed to hold the column 18 upright. The dash pot 354 is connected to the free end of beam 350 and is held by a bracket 356 to the column 18 itself. Fixed to the beam 350 at its fulcrum 352 is a vertical rod 358 which is pinned to the end of the lower control link 322 (FIG. 1) previously described. It will thus be seen that the pivotal movement of the column 18 about the axle 326 creates the linear reciprocal movement in the control link 322 which, as previously described, is translated to the control rod 254 as a tilting force on the rotor hub 250. It will also be seen that rotary actuation of the wheel 340 causes the lower control link 322 to swivel in the horizontal plane, as previously described, resulting in a similar tilting of the rotor hub 250. Both dampening mechanism 328 and the dash pot 354 are self actuating. They act, therefore, to automatically trim or return the column 18 and wheel 340 to their normal or neutral positions, if they are freed of manual restraint placed thereon by the vehicle operator, and consequently the control rod 250 is maintained generally in a neutral position.

It will also be noted that it is only the pivoting, fore and aft, of the steering column 18 which will cause the rotor hub 250 to tilt fore and aft. Operation of the steering wheel 340 causes only side to side movement. This feature has a built-in safety factor, in that, because of the angular disposition of the dampening means 328, the forward and rearward pivoting of the column 18 is spring-controlled. Thus, by lightly clamping locking mechanism 336, the advantages and features of a collapsible steering column for ground operation are obtained.

Figure 11:
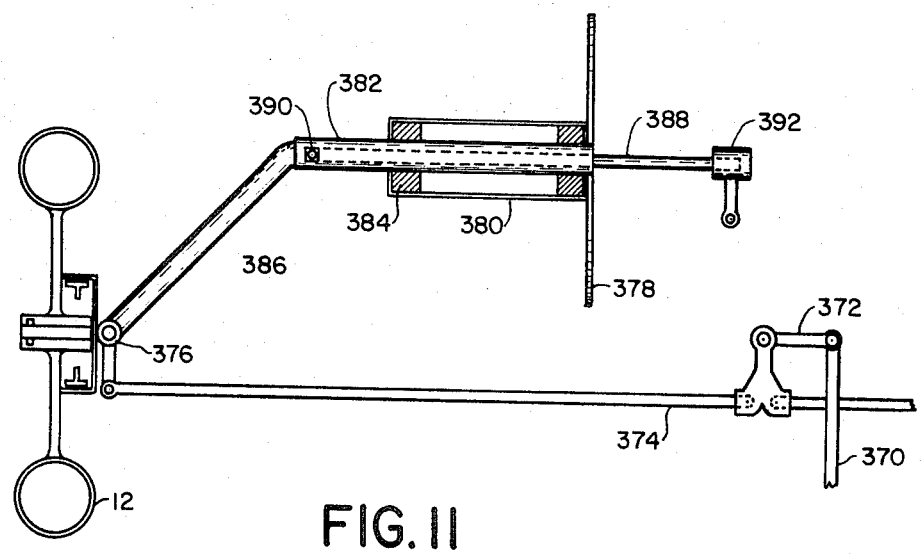
FIG. 11 is an enlarged view of the front end steering and suspension system.

Turning now to the remaining features of the present vehicle, namely, the land steering and suspension systems, reference is made to FIG. 1 and 11. The steering wheel shaft 338 is provided with a screw worm 360 which is engaged by a sector gear 362 secured at the end of an elongated depending arm 364, pivoted at its center by a transverse bolt 366 so that it is movable in an arcuate manner fore and aft by rotation of the wheel 340. The lower end of the arm 364 is pivotally connected to a tie rod 370 and in its neutral position, the pivot point between arm 364 and the tie rod 370 is in alignment with the pivot point of steering column 18. Fore and aft movement of steering column 18 will thus not affect movement of tie rod 370, which extends forward of the vehicle, as seen in FIG. 11, and is connected by a bell crank mechanism 372 to a transverse lever 374. The lever 374 extends across the vehicle and is connected to the kingpin 376 of each of the front wheel assemblies 12 (only one shown in FIG. 11). To actuate the ground steering mechanism just described, the dampening means 328 is located by turning of knob 336 and the collar 344 is loosened by opening the turn-knob 346. Thus, the flight steering mechanism is locked-out and will not interfere with ground handling. On the other hand, it will be noted that there are no facilities provided to lock-out the ground steering mechanism when flight is effected. Since the ground wheels will not effect flight direction such lock-out is unnecessary. However, if desired, suitable means may be provided to this end. This construction has a decided advantage not generally found in the prior art. Here a single control mechanism is provided for both flight and ground modes of travel. Conversion from one mode to another can and is accomplished merely by operation of one or both of the lock mechanisms 336 and 346 and does not require separate control panels, cockpits, etc.

Continuing with FIG. 11, the suspension system is of the trailing arm type with a torsion bar spring action. While only one side of the vehicle is shown, the construction is symmetrical and the complete system will be obvious. Mounted to the underside of the chassis 10 is a mounting plate 378 shaped to conform with the chassis having a tubular axial extension 380 within which a tubular rigid wheel axle member 382 is mounted. The axle 382 to which the wheels are journalled is held by a plurality of bushings 384 and has a solid angular extension 386 directed to the rear of the vehicle which is pivotally connected to the kingpin 376. The bushings 384 support the axle 382 firmly, permitting the extension 386 to trail in cantilevered fashion. Located within the axle 382 and extending substantially to the center line of the chassis 10 is a torsion bar 388. The outward end of which is fixedly secured within the axle 382 as at 390 while the inward end is secured within an adjustable lock mechanism 392 designed to hold the bar with desired flex.

The rear wheel assembly suspension system is similar to the front wheel suspension shown, except that the kingpin and steering mechanism is replaced by the driving axle previously described. This form of suspension system is effective to support the vehicle chassis and to maintain the proper degree of resilient ground action and control. It is simple yet very effective. It is easily adjustable and will respond quickly to modification of loads placed thereon.

Various elements which are desirable for a complete vehicle of this type have been omitted from the present description. For example, it will be necessary to provide some latch or locking means for holding the rotor blade in fixed position during ground travel so that it does not bounce or inadvertently shift position as the vehicle travels over bumpy roads. Such latch means are available and should preferably be located as to hold the rotor blade rearwardly in line with the axial extent of the chassis. A brake mechanism is also necessary for stopping the movement of the vehicle on the ground. Such a system may be of the fluid type common in automotive vehicles. An electrical light, signal and ignition system is also required. It is not proposed to go into lengthy detail of such elements or their combination with the structure herein described since such elements are more or less conventional and freely available from the prior art. They can easily be developed and combined within the present vehicle and there non-disclosure here should in no way be taken as a material limitation or omission.

Having previously described the function of the various structural elements, it is also believed unnecessary to go into great detail concerning the over-all operation of the vehicle. The compressor engine 28 is of course first started and the engine idled to develop a sufficient supply of pressurized fluid air. The operator chooses his mode of travel by activating the control steering column mechanism and the diverting valve 86 accordingly. During ground operation, the operator controls steering through the front wheels 12, permitting the motor 16 to operate automatically if he so desires. Manual throttling may, if he chooses, be accomplished just as in an ordinary automobile. Flight is sustained merely by the continued diversion of compressed air to the rotor assembly. Should, for any reason, the engine 28 cease to function or the diversion of pressurized fluid halt, the rotor assembly should have sufficient momentum to permit auto-rotation for the craft to land slowly and safely.

Having now described a vehicle embodying the present invention, it will be appreciated that the various enumerated objects have been obtained. It will be of interest, however, to point out that the present vehicle reduces the amount of fuel pollutants exhausted to the air since only the compressor engine employs a combustible fuel and, as pointed out in U.S. Pat. No. 3,101,888, of only small quantity.

The vehicle produces highly effective levels of compressed air, utilizing the same in highly efficient and powerful pneumatic motors and jet nozzle rotors producing an economical road and air vehicle.

Specifically, it will be noted that the pneumatic motor is simple in construction, employing no gearing for either speed control or control of internal mechanisms and is, therefore, economical to build and maintain.

The rotor mechanism is not directly connected to the prime mover and, therefore, its speed is not directly a function of the production of compressed air but more of a function of blade pitch and nozzle pressure. The rotor assembly also eliminates anti-torque mechanism and gearing devices and is, therefore, also simple and inexpensive both to fabricate and operate.

In view of the above disclosure which is, of course, illustrative only of the present invention, it is intended that the scope thereof be limited solely by the appended claims.

I claim:

1. A pneumatic motor comprising a supply of compressed fluid as a source of power, an elongated crankshaft, a plurality of cylinders arranged about said crankshaft, each of said cylinders having a fluid inlet for admitting fluid to said cylinder, an outlet for exhausting said fluid and a piston movable therein in response to the flow of fluid therethrough, a common manifold surrounding said respective fluid inlets, a conduit connecting said manifold to said supply of compressed fluid, a rod extending outwardly of each piston and journalled to said crankshaft to rotate the same on movement of said piston, valve means located in each inlet to control flow of fluid into the respective cylinder, and means linked to said crankshaft for operating said valves to sequentially admit fluid from said manifold to said cylinders in phase with a predetermined angular position of said crankshaft about its axis, and including means responsive to changes in pressure of the compressed fluid in said conduit to operate said means linked to said crankshaft.

2. The motor according to claim 1 wherein said means for operating the inlet valves comprises, a cam located on said crankshaft and rotatable therewith, and cam follower means connected to each of said inlet valves, said cam and cam follower means being cooperable on rotation of said crankshaft to open said valves for a predetermined distance and period of time and then to close the same.

3. The motor according to claim 1 wherein said cylinders are disposed radially about said crankshaft, said crankshaft comprising a pair of opposed axial end portions bearingly mounted for rotation and a central angular portion lying in a common plane therewith to which the piston rods are journalled and includes a fly wheel predisposing said crankshaft for rotation in a predetermined direction.

4. The motor according to claim 3 including means for operating the inlet valves at a time other than in phase with said predetermined crankshaft position, thereby effecting reverse rotation of said crankshaft.

5. The motor according to claim 2 wherein said cam is provided with a continuously variable contour and said cam and cam follower means are mounted for relative displacement with respect to each other whereby the opening and closing of the inlet valve may be varied.

6. A pneumatic motor comprising a supply of compressed fluid as a source of power, an elongated crankshaft, a plurality of cylinders arranged radially about said crankshaft, each of said cylinders having a fluid inlet for admitting fluid to said cylinder, an outlet for exhausting said fluid and a piston movable therein in response to the flow of fluid therethrough, a common manifold surrounding said respective fluid inlets, a conduit connecting said manifold to said supply of compressed fluid, a rod extending outwardly of each piston and journalled to said crankshaft to rotate the same on movement of said piston, valve means located in each inlet to control flow of fluid into the respective cylinder, and means linked to said crankshaft for operating said valves to sequentially admit fluid from said manifold to said cylinders in phase with a predetermined angular position of said crankshaft about its axis, said means for operating said valves comprising, a cylindrical member provided with a first circumferentially and axially contoured cam surface providing a uniformly and continuous variation axially along its length, said cylindrical member being mounted on said crankshaft for rotation conjointly therewith and axial displacement relative thereto, a cam follower for each of the inlet valves comprising a roller adapted to ride on said cylindrical member in engagement with said first cam surface, lever means connecting said rollers with their respective inlet valves and being adapted to open and close said inlet in response to the movement of said rollers on said first cam surface, and means for axially displacing said cylindrical member on said crankshaft to vary the opening and closing of said inlet valves in accordance with the relative positions of said cam rollers and said first cam surface.

7. The motor according to claim 6 wherein the cylindrical member is provided with a second cam surface oppositely contoured to that of said first cam surface, and axially positioned adjacent thereto, said first and second contoured cam surfaces being circumferentially offset from each other so that on axial displacement of said cylindrical member from one surface to the other, the cam rollers will effect an out of phase opening of the inlet valves, thereby reversing the operation of said motor.

8. The motor in accordance with claim 6 wherein said first cam surface includes a triangular inclined shelf flaring uniformly in the radial and circumferential direction substantially along the axis of said cylindrical member from one end to the other, whereby the cam roller is adapted to be moved radially outward with respect to said cylindrical member for a predetermined traverse of its circumference.

9. The motor in accordance with claim 8 wherein lever means connecting said inlet valve and the cam roller comprises, a bell crank and spring means normally biasing said inlet valve closed, said bell crank being operable during the traverse of said roller on said triangular cam shelf to open said inlet valve.

10. The motor according to claim 6 including a chamber and a control piston movable therein, a control piston rod extending outwardly of said chamber, means connecting the cylindrical cam member to said control piston rod for free rotary movement and conjoint axial movement therewith, a first duct leading from the conduit supplying compressed fluid to said manifold to said chamber on one side of said control piston, a venturi located within said conduit downstream of said first duct, a second duct leading from said venturi to said chamber on the other side of said control piston, said venturi creating a differential pressure within said chamber causing said control piston to move therein and displace said cylindrical member in response to the flow of fluid in said conduit.

11. The motor according to claim 10 including valve means within the ducts to selectively open and close the same.

12. The motor according to claim 10 including a second chamber, a third duct leading from the supply conduit upstream of said first and second ducts to said third chamber to maintain a pressure therein responsive to the flow of fluid in said conduit, a second control piston and rod extending therefrom, said second control piston being movable under influence of pressure within said chamber to engage the face of the first control piston to prevent its movement in one direction.

13. The motor according to claim 12 including valve means in the third duct for selectively closing said duct to remove the pressure in said second chamber thereby permitting movement of the first control piston in the one direction.

14. A pneumatic motor comprising a supply of compressed fluid as a source of power, an elongated crankshaft, a plurality of cylinders arranged radially about said crankshaft, each of said cylinders having a fluid inlet for admitting fluid to said cylinder, an outlet for exhausting said fluid and a piston movable therein in response to the flow of fluid therethrough, a common manifold surrounding said respective fluid inlets, a conduit connecting said manifold to said supply of compressed fluid, a rod extending outwardly of each piston and journalled to said crankshaft to rotate the same on movement of said piston, valve means located in each inlet to control flow of fluid into the respective cylinder, and means linked to said crankshaft for operating said valves to sequentially admit fluid from said manifold to said cylinders in phase with a predetermined angular position of said crankshaft about its axis, including means for controlling the volume of fluid admitted to each cylinder inversely responsive to the flow of fluid to the manifold.

* * * * *